United States Patent Office 3,397,163
Patented Aug. 13, 1968

3,397,163
COATED POLYOLEFIN FILM STRUCTURE AND
PROCESS OF PREPARATION THEREOF
Michael Francis Bruno and John Damian Sculley, Tonawanda, N.Y., assignors to E. I. du Pont de Nemours and Company, Wilmington, Del., a corporation of Delaware
No Drawing. Filed Jan. 28, 1964, Ser. No. 340,822
5 Claims. (Cl. 260—28.5)

ABSTRACT OF THE DISCLOSURE

A coated film structure of a polyolefin such as polyethylene is provided wherein the coating is a composition of a copolymer of vinylidene chloride, an alkyl acrylate and acrylic acid admixed with a naturally occurring wax such as carnauba.

---

This invention relates to polymeric coating compositions and more particularly to vinylidene chloride copolymer coating compositions for improving the properties of polyolefin films.

In the development of films for the packaging market, in particular polymeric films such as the polyolefins, it is found necessary to apply coatings on them to provide such features as sealability, protection against greases, oils, and undesired permeation of gases such as oxygen, carbon dioxide and the like. It has been found that coatings based on vinylidene chloride copolymers provide many of these desired features. In the adaptation of vinylidene chloride copolymer coatings to the polyolefin films, however, it has been observed that in many insttances a coated film which will ultimately have good protection against moisture and undesired oils and vapors, has a tendency when first prepared to be somewhat tacky and to have poor surface slip characteristics. This contributes to the formation of very poorly wound rolls especially at the mill roll stage. Undesired wrinkling and puckering of the film in the mill roll entails poor quality film and excessive waste in production operations.

It is further observed that vinylidene chloride copolymers coated on polyolefin films have a tendency to degrade in respect to heat sealability as the film ages. Consequently, unsatisfactory heat sealing performance is experienced in customer operations.

A further requirement is that the coated film should be readily sealable at reasonably low temperatures particularly where the film substrate is thermally sensitive, for example heat shrinkable films. The readily sealable coated film must not, however, be subject to blocking when stored under hot weather conditions.

It is, therefore, an object of this invention to provide a coated polyolefin film which will meet the stringent requirements outlined above.

It is a further object of this invention to provide a vinylidene chloride copolymer coated polyolefin film which has good immediate surface slip and improved resistance to oxygen gas permeation, which after aging is readily sealable at moderate temperatures and is resistant to blocking in storage. These and other objects will appear hereinafter.

These and other objects of this invention are accomplished by providing a coated film comprising: a biaxially oriented polyolefin base sheet, preferably polypropylene film having a shrinkage of less than 5% when heated at 130° C. for one minute, having at least one surface treated to promote adhesion of a coating thereon and a coating on the treated surface of (1) a copolymer of from about 60 to 85 parts, preferably 78 to 82 parts, of vinylidene chloride, from about 17 to 40 parts, preferably 18 to 22 parts, of an alkyl acrylate wherein the alkyl group is from 1 to 3 carbon atoms such as methyl acrylate and from about 1 to 10%, preferably 3 to 6%, of acrylic acid based on the total weight of vinylidene chloride and alkyl acrylate, the copolymer having an intrinsic viscosity of at least 0.5 and preferably in the range of 1.0 to 2.0, as measured in tetrahydrofuran at 30° C. and (2) about 2.0 to 7.5%, preferably 4 to 6%, by weight based on the total weight of vinylidene chloride copolymer of a natural occurring wax, preferably carnauba way, having a melting point above 75° C. and preferably within the range of about 75° C. to 100° C.

The vinylidene chloride copolymer coating at lower than 60 parts by weight vinylidene chloride has a tendency to be brittle, while a vinylidene chloride content greater than about 85 parts by weight gives a coating which exhibits poor immediate surface slip and marginal heat seal performance. While a film coated with a copolymer of the present vinylidene chloride content has a good heat sealing range and retention of heat sealability as well as good immediate surface clip compared to coatings of higher vinylidene chloride content, the films' tendencies toward blocking with storage is prevented when the wax is incorporated in the coating composition.

The wax employed should be a natural occurring wax and should have a melting point above 75° C. and preferably below 100° C. so that it does not interfere with ready sealability nor contribute to blocking of the film in storage. Waxes such as carnauba, montan, ouricury and sugar cane wax are especially suitable.

The waxes should be emulsifiable and preferably by means of various nonionic surface active agents so as to be compatible with the aqueous vinylidene chloride copolymer dispersions. Among the preferred emulsifying agents are the polyhydroxy nonionic surfactants such as the esters of the sugar alcohols, sorbitol and mannitol. Typical among these are polyoxyethylene sorbitan monolaurate, polyoxyethylene sorbitan monopalmitate, polyoxyethylene sorbitan monostearate and polyoxyethylene sorbitan monooleate. Other operable nonionic surfactants include those obtainable from condensation of ethylene oxide with alkyl and alkanolamides, with aliphatic alcohols particularly those with at least an eight carbon chain, with alkyl thiols, with phenols and with aliphatic and aromatic carboxylic acids. In dispersing the wax it is desirable to use the minimum amount of surfactant that will give a stable aqueous dispersion of the wax. Satisfactory dispersions are obtained with wax/surfactant rates in the range of 1:1 to 5:1. Too large an amount of dispersing agent can interfere with heat sealability of the coated film.

As indicated, best results, particularly with respect to ready heat sealability, are obtained with a copolymer having an intrinsic viscosity between 1.0 and about 2.0. At intrinsic viscosities below about 0.7, the copolymer coated film shows a tendency toward blocking. Coating copolymers with an intrinsic viscosity greater than 2.0 are also operable, with appropriate adjustment of copolymer composition. The desired level of intrinsic viscosity is achieved mainly by regulating reaction temperature and catalyst concentration.

The base sheet employed in the present invention is a polyolefin film which has been biaxially oriented by known techniques. The preferred films are biaxially oriented polyethylene and polypropylene films which have been pretreated to promote adhesion of a coating on at least one surface, preferably both surfaces. Polyolefin film is pretreated by subjecting it to treatments such as (1) electrical discharge treatment (2) flame treatment or (3) treatment with oxidizing solutions. Polypropylene film which has a shrinkage of less than 5% when heated at 130° C. for one minute is the most preferred base sheet.

The coatings can be applied in the form of aqueous dispersions, as in the following example, in accordance with any known coating techniques. They can be applied by passing the film through baths in a continuous manner or in a batch manner. Coatings can also be sprayed onto the film or applied manually by brushing or the like. The thickness of the coatings can be adjusted in accordance with methods well known in the coating art.

The invention can be more fully understood by referring to the following example:

A typical vinylidene chloride/methyl acrylate/acrylic acid (80/20/4) copolymer dispersion is prepared as follows: In a reactor fitted with stirrer and condenser and flushed with nitrogen there is placed at room temperature the following:

| | Lbs. |
|---|---|
| Water | 130.0 |
| "Duponol" WAQ [1] | 4.14 |
| Acrylic acid | 4.8 |
| Methyl acrylate | 24.0 |
| Vinylidene chloride | 96.0 |

[1] "Duponol" WAQ (Du Pont Company), sodium salt of a fatty alcohol sulfate in aqueous solution, 33% active ingredient.

The weigh tank is flushed with 40.0 lbs. of water, which is added ot the ingredients listed above, after which heating of the reaction mixture is started. When the temperature of the mixture reaches about 29° C., 18.0 grams of ammonium persulfate dissolved in water is added. At a temperature of 30–31° C., 9.0 grams of sodium metabisulfite and 0.6 gram of ferrous ammonium sulfonate, both dissolved in a small quantity of water are added. Thereafter, the loading ports of the reactor are flushed with water (total, including that added with catalyst, 11.0 lbs.) and heating is continued.

The condenser of the reactor is left open to the atmosphere for 30 to 45 minutes as the reaction mixture begins to reflux at about 35° C., it is then closed as the exothermic reaction proceeds, during which a pressure of about 5 p.s.i.g. develops. When the reaction mixture stops refluxing, nitrogen is introduced through the condenser to a pressure of 5–10 p.s.i.g. until the mixture begins to cool, indicating completion of the reaction. A portion of the copolymer is isolated and its intrinsic viscosity determined a solution of 1.0 gram of copolymer in 100 ml. of tetrahydrofuran at 30° C. shows an intrinsic viscosity of 1.1.

There is then added to the reactor an additional 4.14 lbs. of "Duponol" WAQ [1] mixed with 4.0 lbs. of water and 100 ml. of concentrated ammonium hydroxide. The reaction mixture is filtered after which carnauba wax dispersed as a 10% emulsion with 2.3%/2%—Span 60/Tween 60 mixture [2] is added to the mixture to give 5% wax solids based on the total weight of the copolymer solids.

A one mil thick biaxially oriented polypropylene film, treated for adherability by subjecting its surface to a substantially neutral flame as the film is passed over a drum maintained at 70° C., following the procedure of U.S. Patent 2,648,097, is passed at 50 feet per minute through a coating bath of an aqueous dispersion of a vinylidene chloride copolymer prepared as described above. Excess dispersion is doctored from the film surface and the coated film is dried by passing through a coating tower held at a temperature of 60–65° C. The dried film, bearing 6 grams per square meter of coating, is wound into mill rolls; the film has excellent immediate surface slip and very high quality, well formed mill rolls with no indication of wrinkling or buckling are obtained. Similar results are obtained when the coating operation is carried out at 150 feet/minute.

The details of the methods for testing the coated films follow:

Heat-seal strength is measured by cutting a piece of the coated film, 4" x 10", into two pieces, 4" x 5" each, with the long direction being in the direction of polymer extrusion (the machine direction). The two pieces are then superimposed so that opposite surfaces (the coated surfaces) are in contact. The two pieces of superimposed film are then sealed together at each end at right angles to the machine direction axis. For these tests, the films are sealed using a pressure of 10 p.s.i. for a 0.25 second dwell time and at the temperatures specified in the various examples, usually 130° C. The sealed sheets are then cut in half at right angles to the machine direction axis. From the center of the resulting pieces, one inch wide strips parallel to the machine axis are cut. These are conditioned for one day at 75° F. and 25% relative humidity and then tested by placing the free ends of the strips in a Suter Tester Machine and pulling them apart. The highest force in grams required to pull the strips apart is taken as a measure of the heat-seal bond strength.

Intrinsic viscosity is determined as described in "Textbook of Polymer Chemistry," F. W. Billmeyer, Jr., Interscience Publishers, Inc., New York, 1957, Chapter 14. It is defined as follows:

$$\text{Intrinsic viscosity} = \left(\frac{Ln\ Nr}{C}\right) C \rightarrow 0$$

wherein $Ln$ is the natural logarithm, $Nr$ is the viscosity of the solution relative to the solvent and "C" is the concentration expressed in grams of solute per 100 ml. of solvent. In the present invention, tetrahydrofuran is used as the solvent.

Oxygen permeability is measured by sealing the test film between the high and low pressure side of a split permeability cell. The test gas is passed through the high pressure side; the low pressure side to which a manometer is attached is evacuated to a pressure of approximately 3 millimeters of mercury. At this point, the low pressure side is sealed off; but, the flow of the test gas at one atmosphere is continued through the high pressure side. Diffusion of gas through the test film is then graphically recorded by plotting the rate of fall of the manometer as a function of time. Gas laws are applied to the data so obtained and the gas permeability value is expressed in grams/100 sq. meters/hr.

The blocking test is conducted by stacking sheets of the coated film under a pressure of 1½ lb./square inch and placing the stack in an oven at 130° F. for 18 hours. The stored films are graded for blocking as follows: 10—no evidence of sheets sticking together; 8—sheets slightly cling together—can be separated without damage to the coating; 6—sheets stuck together tightly.

Heat-seal strength values in the range of 300–400 grams/inch are obtained on sealing the film at 130° C. using a pressure of 10 p.s.i. and a dwell time of 0.25 second. A typical sample, which shows a heat-seal value of 350 grams/inch when tested initially, is aged for approximately one month at which time it shows a heat-seal strength of 325 grams. The heat-seal strength is still at a high level and indicates very little degradation in heat-seal strength. With respect to surface slip characteristics, the film shows a film-to-film coefficient of friction of 0.301 and a running coefficient of 0.371. The film shows a blocking grade of 9–10 at 130° F. and an oxygen permeability value of 0.129 gram/100 m.²/hr.

A coated polypropylene film made as above except with a coating dispersion containing 1% of carnauba wax shows a blocking grade of 6; with a dispersion containing 8.0% carnauba wax a blocking grade of 10 is obtained but the coated film has a poor appearance.

As a further control, a similar polypropylene film made as above is coated with a vinylidene chloride copolymer comprising 89 parts by weight of vinylidene chloride, 10 parts by weight of methyl acrylate and 1%

---

[1] "Duponol" WAQ (Du Pont Company), sodium salt of a fatty sulfate in aqueous solution. 33% active ingredient.
[2] Span 60/Tween 60 (Atlas Powder Co.), sorbitan monooleate polyoxyethylene/sorbitan monooleate mixture.

by weight of acrylic acid. This coated film shows very poor surface slip immediately upon coating as indicated by the presence of wrinkles in the mill roll as well as by a film-to-film starting coefficient of 0.651 and a running coefficient of .467. The film has an oxygen permeability value of 0.5 g./100 m.²/hr., considerably higher than the film of the example. Further, this coated film, which shows a heat-seal value of 350 grams per inch immediately after preparation, shows a degradation in heat-seal value down to 100 grams/inch after the film has aged for approximately one month.

The materials of the invention are used advantageously as packaging materials for foods, cigarettes, and the like. They provide strong, flexible materials, that, can be easily converted to packages. The coating improves immediate surface slip thereby permitting the formation of good quality mill roll stock. Also, the coating permits ready heat-sealability after aging to give strong seal bonds and freedom from blocking or sticking which permits storage of the film without quality degradation and insures good operability on various sealing and bagging operations.

What is claimed is:

1. A coated film comprising: a biaxially oriented polyolefin base sheet having both surfaces treated to promote adhesion of a coating thereon and a coating on both treated surfaces of (1) a copolymer of from about 78 to 82 parts of vinylidene chloride, from about 18 to 22 parts of a methyl acrylate and from about 3 to 6% acrylic acid based on the total weight of said vinylidene chloride and said alkyl acrylate, said copolymer having an intrinsic viscosity within the range of about 1.0 to 2.0 as measured in tetrahydrofuran at 30° C. and (2) about 4 to 6% by weight, based upon the total weight of said vinylidene chloride copolymer, of a natural occurring wax having a melting point within the range of about 75° C. to 100° C.

2. The coated film of claim 1 wherein the biaxially oriented polyolefin base sheet is biaxially oriented polypropylene having a shrinkage of less than 5% when heated at 130° C. for one minute.

3. The coated film of claim 1 wherein the natural occurring was is carnauba wax.

4. The coated film of claim 3 wherein the copolymer is of 80 parts vinylidene chloride, 20 parts methyl acrylate and 4% by weight of acrylic acid based on the total weight of vinylidene chloride and methyl acrylate.

5. A composition of matter comprising: a copolymer of from about 78 to 82 parts of vinylidene chloride, from about 18 to 22 parts of methyl acrylate and from about 3 to 6% acrylic acid based on the total weight of said vinylidene chloride and alkyl acrylate, said copolymer having an intrinsic viscosity within the range of about 1.0 to 2.0 as measured in tretrahydrofuran at 30° C. and about 4 to 6% by weight, based upon the total weight of said vinylidene chloride copolymer, of a natural occurring wax having a melting point within the range of about 75° C. to 100° C.

References Cited
UNITED STATES PATENTS

| | | | |
|---|---|---|---|
| 2,525,671 | 10/1950 | Hauser | 260—28.5 |
| 2,829,069 | 4/1958 | Michel | 117—76 |
| 3,041,208 | 6/1962 | Hay et al. | 117—138.8 |

MORRIS LIEBMAN, *Primary Examiner.*

H. KAPLAN, *Assistant Examiner.*